(12) United States Patent
Anand et al.

(10) Patent No.: US 8,595,798 B2
(45) Date of Patent: Nov. 26, 2013

(54) ENFORCING DATA SHARING POLICY THROUGH SHARED DATA MANAGEMENT

(75) Inventors: Rangachari Anand, Teaneck, NJ (US); Stacy F. Hobson, Poughkeepsie, NY (US); Juhnyoung Lee, Yorktown Heights, NY (US); Jeaha Yang, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/163,373

(22) Filed: Jun. 17, 2011

(65) Prior Publication Data

US 2012/0324529 A1 Dec. 20, 2012

(51) Int. Cl.
*G06F 7/04* (2006.01)

(52) U.S. Cl.
USPC ........... 726/4; 726/1; 726/6; 726/27; 713/167

(58) Field of Classification Search
None
See application file for complete search history.

(56) References Cited

U.S. PATENT DOCUMENTS

| | | | |
|---|---|---|---|
| 5,550,971 A | 8/1996 | Brunner et al. | |
| 5,590,326 A | 12/1996 | Manabe | |
| 5,649,102 A | 7/1997 | Yamauchi et al. | |
| 5,872,850 A | 2/1999 | Klein et al. | |
| 6,064,968 A | 5/2000 | Schanz | |
| 6,256,676 B1 | 7/2001 | Taylor et al. | |
| 6,327,594 B1 | 12/2001 | Van Huben et al. | |
| 6,591,265 B1 | 7/2003 | Erickson et al. | |
| 6,779,184 B1 | 8/2004 | Puri | |
| 7,114,146 B2 | 9/2006 | Zhang et al. | |
| 7,131,057 B1 | 10/2006 | Ferrucci et al. | |
| 7,237,225 B2 | 6/2007 | Kompalli et al. | |
| 7,293,010 B2 | 11/2007 | Angele et al. | |
| 7,305,392 B1 | 12/2007 | Abrams | |
| 7,509,326 B2 | 3/2009 | Krabel et al. | |
| 7,571,447 B2 | 8/2009 | Ally et al. | |
| 7,603,300 B2 | 10/2009 | Haffner et al. | |
| 7,617,174 B2 | 11/2009 | Chen et al. | |
| 7,620,980 B1 | 11/2009 | Wood et al. | |
| 7,631,089 B2 | 12/2009 | Knauerhase et al. | |
| 7,725,429 B2 | 5/2010 | Rangadass et al. | |
| 7,895,445 B1 | 2/2011 | Albanese | |
| 8,271,443 B1 * | 9/2012 | Swift et al. .................... | 707/640 |
| 2003/0137539 A1 | 7/2003 | Dees | |
| 2005/0055556 A1 | 3/2005 | Shiu et al. | |

(Continued)

OTHER PUBLICATIONS

Loser, et al., Master Data Management for Collaborative Service Processes, International Conference on Service Systems and Service Management, Beijing, China, 2004.

(Continued)

*Primary Examiner* — Kaveh Abrishamkar
(74) *Attorney, Agent, or Firm* — Scully, Scott, Murphy & Presser, P.C.; William Stock, Esq.

(57) ABSTRACT

Enforcing data sharing policy through shared data management, in one aspect, may include extracting data access rights from the one or more data policies based on a user role, data purpose, an object set and a constraint identification; extracting a data domain from the one or more data policies based on the data purpose and the object set; associating the data access rights and the data domain with data attributes of the shared data; automatically responding to application-based offers and requests for the shared data within a Software-as-a-Service platform based on the data access rights.

24 Claims, 5 Drawing Sheets

(56) References Cited

U.S. PATENT DOCUMENTS

| | | | |
|---|---|---|---|
| 2006/0259923 A1 | 11/2006 | Chiu | |
| 2006/0287890 A1 | 12/2006 | Stead | |
| 2007/0220035 A1 | 9/2007 | Misovski | |
| 2007/0220588 A1 | 9/2007 | Panda et al. | |
| 2007/0239858 A1* | 10/2007 | Banerji et al. | 709/220 |
| 2007/0282748 A1 | 12/2007 | Saint Clair | |
| 2008/0059543 A1 | 3/2008 | Engel | |
| 2008/0256467 A1 | 10/2008 | Chu | |
| 2009/0099852 A1 | 4/2009 | Ouimet | |
| 2010/0030623 A1 | 2/2010 | Guglani | |
| 2010/0122155 A1 | 5/2010 | Monsarrat | |
| 2010/0175112 A1* | 7/2010 | Loeb et al. | 726/4 |
| 2010/0205432 A1* | 8/2010 | Corda et al. | 713/159 |
| 2010/0218167 A1 | 8/2010 | Turner et al. | |
| 2011/0010759 A1 | 1/2011 | Adler | |
| 2011/0025707 A1 | 2/2011 | Fujioka | |
| 2011/0047597 A1 | 2/2011 | Mahaffey | |
| 2011/0078243 A1 | 3/2011 | Carpenter | |

OTHER PUBLICATIONS

Ullman, Information integration using logical views, Theoretical Computer Science—Special issue on the 6th International Conf. on DB Theory—ICDT, vol. 239 Is. 2, May 2000.

Genesereth, et al., Infomaster: an information integration system, SIGMOD '97 Proceedings of the 1997 ACM SIGMOD international conference on Management of data, 1997.

Arens, et al., Query reformulation for dynamic information integration, Journal of Intelligent Information Systems, vol. 6 Issue 2-3, Jun. 1996.

Themistocleous, et al., ERP and application integration: Exploratory survey, AMCIS 2001 proceedings.

Lee, et al., Enterprise integration with ERP and EAI, Communications of the ACM, vol. 46 Issue 2, Feb. 2003.

Zeng, et al., QoS-aware middleware for Web services composition, IEEE Transactions on Software Engineering, vol. 30 Issue 5, May 2004.

Zeng, Quality driven web services composition, WWW '03 Proceedings of the 12th international conference on World Wide Web, 2003.

Milanovic, Current Solutions for Web Service Composition, IEEE Internet Computing, vol. 8 Issue 6, Nov. 2004.

Benatallah, et al., The Self-Serv environment for Web services composition, IEEE Internet Computing, vol. 7 , Issue 1, Jan./Feb. 2003.

Casati, et al., Adaptive and Dynamic Service Composition in eFlow, CAiSE '00 Proceedings of the 12th International Conf. on Advanced Information Systems Engineering, 2000.

Gold, et al., Understanding Service-Oriented Software, IEEE Software, vol. 21 Issue 2, Mar. 2004.

Drummond, et al., A Data Broker for Distributed Computing Environments, ICCS '01 Proceedings of the International Conference on Computational Sciences—Part I, 2001.

Modahl, et al., MediaBroker: An Architecture for Pervasive Computing, PERCOM '04 Proceedings of the 2nd IEEE Intntnl Conf. on Pervasive Computing and Communications, 2004.

Mouhib Alnoukari, Applying Adaptive Software Development (ASD) Agile Modeling on Predictive Data Mining Applications: ASD-DM Methodology, Int. Symposium on Info. Tech., 2008.

Cervantes, et al, A Framework for Constructing Adaptive Component-Based Applications: Concepts and Experiences. 7th Symposium on Computer-Based Software Engineering, 2004.

Gui, et al, An Architectural Based Framework for Managing Adaptive Real-time Applications, 35th Euromicro Conference on Software Engineering and Advanced Applications, 2009.

Mena, et al, A Software Retrieval Service Based on Adaptive Knowledge-Driven Agents for Wireless Environments, ACM Transactions on Autonomous & Adaptive Systems, V.1 I.1 2006.

Jeff Kelly, New Online Marketplace Could Boost Data Integration Applications, DataManagement.com, Feb. 18, 200. http://searchdatamanagement.techtarget.com/news/1389686.

Turner, Turning Software into a Service, Computer, vol. 36 Issue 10, Oct. 2003.

Deep Secure, The Deep-Secure Mail Guard Applies Policy Enforcement and Content Checking to Email, Deep Secure Mail Guard Information and Fact Sheet, 2010.

* cited by examiner

US 8,595,798 B2

ENFORCING DATA SHARING POLICY THROUGH SHARED DATA MANAGEMENT

FIELD

The present application relates generally to computers, applications and managing shared data on a Software-as-a-Service (SaaS) platform, and more particularly to enforcing data sharing policy through shared data management, for example, by associating data rights at the data attributes level of the shared data.

BACKGROUND

In many entities still, in-house IT applications are poorly integrated, for example, with disparate applications running on their own, even when there are commonalities in the data those applications use. In such cases, data updated by one application is usually imported to another application manually. For instance, an IT administrator may have to manually access data updated or used by one application and load on to another application.

Take for example, local or municipal government's IT applications used to support service delivery for the municipalities. Those applications are typically aligned directly to the departmental structure, with application(s) covering only the tasks associated with a single department. However, services offered and provided to citizens often involve the work of many departments. Consider, for example, a parcel that has been recently renovated by its owners. The parcel owner applies for a building permit from the Building department. After the work has been completed and the Certificate of Occupancy has been issued, the Assessor's office must update the parcel details to reflect the renovations and initiate a parcel reassessment. The newly assessed value has to be updated in the tax system for calculation of the property tax liability. Finally, the property tax payments collected by the tax department are directly entered into the tax system, and must later be updated in and reconciled with the accounts of the Finance department's General Ledger. This example describes the complex interactions between four departments as part of the administration for parcel management services including the renovations, assessment and property tax processes.

In many cases, the departments all use distinct, noninte-grated, custom software programs to aid in their work. Additionally, departments may also use paper-based records and manual record-keeping. Municipalities may choose to pay for pair-wise integration between software applications or purchase preintegrated software packages, especially for departments that share information frequently. Departments such as Police and Justice, Assessment and Tax, Personnel and Finance rely heavily on the sharing of information that is central to their work. The Police department must notify the Justice department of arrest and investigation details as input to current and future court cases. The Assessment department must periodically give the Tax department the tax roll, a listing of all taxable parcels, their current assessment values, and valid exemptions. The Personnel department (and/or individual departments) maintains information on employee pay rates, raises, benefits, and work hours. These factors are used to calculate semi-monthly pay to produce payroll checks.

Although municipalities have the choice to pay for integration between independent applications, the cost is usually prohibitive. Additionally, the association of IT applications to a single specific department can be a limiting factor for service offerings. The applications are not flexible to adapt to new needs, therefore the only way currently to have this information reflected in multiple department software is through constant manual transmission and inputting.

BRIEF SUMMARY

A method and system of managing shared data for one or more applications hosted on one or more Software-as-a-Service platforms may be provided. The method, in one aspect, may include receiving one or more data policy specifications from a policy specification engine, and extracting data access rights from the one or more data policies based on a user role, data purpose, an object set and a constraint identification. The method may also include extracting a data domain from the one or more data policies based on the data purpose and the object set. The method may further include associating the data access rights and the data domain with data attributes of the shared data. The method may yet further include automatically responding to application-based offers and requests for the shared data within a Software-as-a-Service platform based on the data access rights. The method may also include identifying based on the data domain, one or more applications as an authoritative source for attribute-level data sharing within a Software-as-a-Service platform. The method may further include enforcing data sharing constraints between multiple Software-as-a-Service platforms based on the data rights and the data domain. The method may also include appending policy details, the policy details including the data domain and the data access rights associated with the data attributes of the shared data, to a shared data packet. The method may further include propagating the shared data packet to one or more applicable applications within a single Software-as-a-Service platform, and propagating the shared data packet to one or more applicable external Software-as-a-Service platforms.

A system for managing shared data for one or more applications hosted on one or more Software-as-a-Service platforms, in one aspect, may include a shared data management module operable to execute on a processor, and further operable to receive one or more data policy specifications from a policy specification engine. The shared data management module may be further operable to extract data access rights from the one or more data policies based on a user role, data purpose, an object set and a constraint identification. The shared data management module may be further operable to extract a data domain from the one or more data policies based on the data purpose and the object set. The shared data management module may be further operable to associate the data access rights and the data domain with data attributes of the shared data. The shared data management module may be also operable to automatically respond to application-based offers and requests for the shared data within a Software-as-a-Service platform based on the data access rights. The shared data management module may be yet further operable to identify based on the data domain, one or more applications as an authoritative source for attribute-level data sharing within a Software-as-a-Service platform. The shared data management module may be also operable to enforce data sharing constraints between multiple Software-as-a-Service platforms based on the data rights and the data domain. Yet further, the shared data management module may be operable to append policy details to a shared data packet. The policy details may include the data domain and the data access rights associated with the data attributes of the shared data. The shared data management module may be further operable to propagate the shared data packet to one or more applicable applications within a single Software-as-a-Service platform, and propagate the shared data packet to one or more applicable external Software-as-a-Service platforms.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
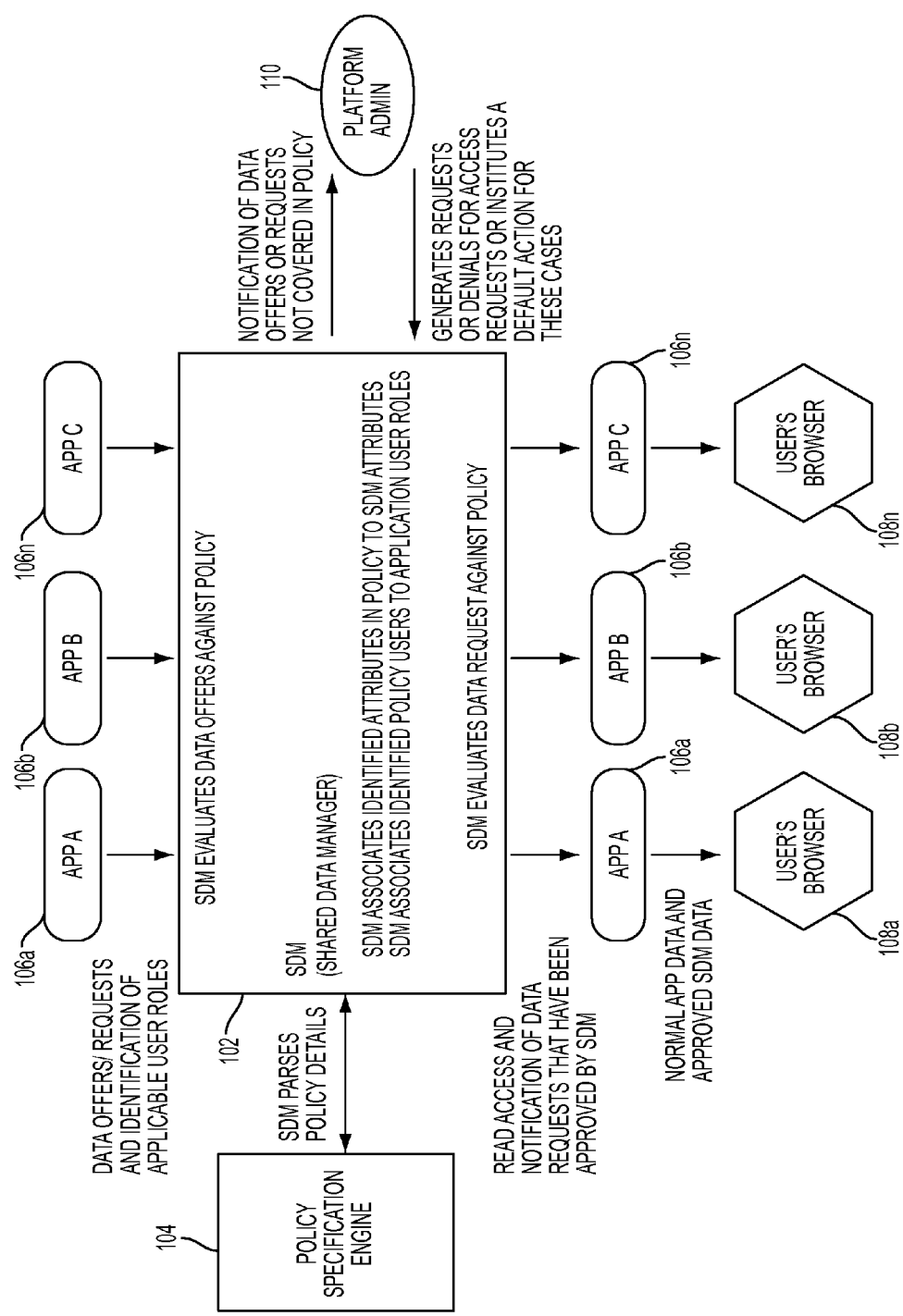
FIG. 1 is a diagram illustrating SDM enforcing data sharing policies in one embodiment of the present disclosure.

Shared data management (SDM) enables platform-mediated data sharing among applications, for example, in Software-as-a-Service platform. Software-as-a-Service or SaaS refers to providing the use of software or application as a service on demand, for instance, by subscription, e.g., in a "pay-as-you-go" model. A customer or a user subscribes for the use of a software application, for instance, as needed by the customer. Typically, an application being provided as a service is resident in a remote platform which a customer may access via a network (e.g., the Internet via a browser or the like interface). The remote platform may include a number of different applications. For instance, a provider of SaaS provides a computing platform and resources for running applications. The applications need not have been developed by the provider, but may have been deployed and set up on the platform by independent software vendors. SDM provides a common database system, a common data object schema or model, and logic or algorithms for enabling those applications to share data. SDM is described in detail in co-owned U.S. patent application Ser. No. 13/051,303 entitled, "Shared Data Management in Software-As-A-Service Platform" and filed on Mar. 18, 2011, which application is incorporated herein by reference in its entirety. Co-owned U.S. patent application Ser. No. 13/163,274 entitled, "Open Data Marketplace for Municipal Services" and filed on Jun. 17, 2011 describes data marketplace, co-owned U.S. patent application Ser. No. 13/163,177 entitled, "Dynamic Application Adaptation in Software-As-A-Service Platform" and filed on Jun. 17, 2011 describes dynamic application adaptation. Those applications are incorporated herein by reference in their entirety.

In sharing the data, "data trades" performed among applications. For example, applications may offer to update specific attributes of shared objects and/or request to read specific attributes of shard objects. An SDM administrator may accept or reject an update offer and requests to read. In one embodiment of the present disclosure, an automatic methodology may be provided that automatically accepts and declines such data access (offers and updates), without the intervening administrator, for instance, based on governance policies associated with the data.

Organizations, especially in the public sector, develop detailed governance documents, known as policies, to describe how information and other resources can be accessed.

These policies may extend beyond the scope of normal information technology (IT)—based policies, in that they may also describe restrictions on the location of data, and if and how data can be sold and/or traded. The methodology of the present disclosure in one embodiment may enforce policies, governance, and compliance requirements in SDM, for instance, by considering restriction on data movement within the system and implementing such requirements as an extension to the shared data management component, and validating and authorizing the access for specific users to SDM data.

In one aspect, SDM augmented with data sharing policy enforcement capabilities may perform the following functionalities: SDM parses a policy specification to identify associated data attributes, user roles, and applications; SDM aligns policy characteristics (data attributes and user roles) with specific application-level details; SDM reviews data offers and requests made by applications to determine appropriate action on policy; SDM automatically grants or denies data offers and requests based on policy; SDM appends shared data with global policy specifications.

SDM uses details from organization's specified policies to automatically determine the outcome of data offers. Data offers refer to access requests from applications to update SDM data object attributes. SDM uses details from organization's specified policies also to automatically determine the outcome of data requests. Data requests refer to access requests from applications to read SDM data object attributes. SDM uses details from organization's specified policies further to automatically determine access rights for specific user roles to SDM data object attributes, enact temporal or other constraints on the data, regulate data requests, trades or purchase by external organizations, enable applications receiving shared data to enforce global access policies.

In one embodiment, SDM provides for data sharing policy enforcement. SDM receives a policy from a policy specification engine. SDM parses policy to identify associated data attributes, user roles, and applications. SDM aligns policy characteristics (data attributes and user roles) with specific application-level details. SDM reviews data offers and requests made by applications to determine appropriate action on policy. SDM automatically grants or denies data offers and requests based on policy. SDM appends access policy details to shared data packet for global enforcement. SDM identifies data offers and requests that are ambiguous or not covered by policy and routes to platform administrator for review. SDM may also use preset guidelines from administrators on how to handle, e.g., 'always accept' or 'always deny'.

FIG. 1 is a diagram illustrating SDM enforcing data sharing policies in one embodiment of the present disclosure. SDM 102 receives data policy specifications from a policy specification engine 104. The policy specification engine 104 may be a policy authoring tool or such application. The policy specification engine 104 allows users to create and record policies, for example, in digital format, for enforcement. A policy extraction module or engine, which may a component of SDM 102, or SaaS platform, parses the digital policies, and may also check for ambiguities and/or conflicts.

SDM 102 may parse and process the data policy specifications and extract data rights from the one or more data policies based on a user role, a purpose, an object set and constraint identification. Policy statements define access rights for users to specified data attributes. The user role specifies what type of user is accessing the data, e.g., an employee, a manager, a human resource personnel, and others. The purpose specifies the purpose of the application, for example, building related application, tax related application, assessment related application, finance related application and others. The object set specifies the data object, for example, parcel, citizen, employee, internal_asset, and others. The constraint identification identifies the constraints in data access specified in the policy rules. Policy statements define access rights for users to specified attributes. SDM 102 further extracts the data domain from the one or more data policies based on data purpose and object set identification. Data domain may be categories of data. There may be multiple categorizations of data. For example, data may be categorized by authorization level or right, for instance, data accessible only by privileged users such as administrators, or data accessible by end-users, and other such authorization levels or rights. Data also may be categorized by application, e.g., each application may have different access rights to data. Data further may be categorized by tenants, for example, data accessible by municipality 1, data accessible by municipality 2, and the like.

SDM 102 associates the data rights and domain with data attributes of the shared data. SDM has a common object model, i.e., data attributes of data objects such as parcel and citizen. The data objects in SDM can be associated with the data categories (data domains), e.g., SDM data attributes accessible only by privileged users such as administrators, data accessible by end-users (data domain by users), SDM data attributes accessible by selected applications only (data domain by applications). SDM 102 associates identified attributes in one or more policy rules to SDM data attributes and associates identified policy users to application user roles. In response to receiving an offer to update or request to read the shared data in SDM 102 from one or more applications 106*a*, 106*b*, 106*n*, SDM 102 then evaluates data request against the policy, using the data rights to automatically respond to application-based offers and requests for the shared data within a Software-as-a-Service platform. A user interface, for example, a browser 108*a*, 108*b*, 108*n*, then may be enabled to present the data approved by SDM 102.

In one embodiment, SDM 102 may send data offers and requests received from one or more applications 106*a*, 106*b*, 106*n*, but are not covered by a policy, to a platform administrator or an administrator module 110. The platform administrator or an administrator module 110 may generate grants or denials for those offers and requests and respond to SDM 102.

SDM 102 may use the data domain to identify singular application as an authoritative source for attribute-level data sharing within a Software-as-a-Service platform. For example, consider the data domain by application in which data attributes in SDM are categorized by application which can access (write and/or read) the shared data. By the categories, SDM can identify one or more applications which are the authoritative writer for each data attribute. SDM data access permission mechanism controls the access of the data attributes by other applications.

SDM 102 may also use the data rights and domain to enforce data sharing constraints between multiple Software-as-a-Service platforms. For example, consider a municipality or an end-user subscribing applications (services) from multiple SaaS platform employing SDM. There may be multiple SDMs the municipality has to deal with, but the municipality has a single set of policies across multiple SDMs. SDMs in different SaaS platforms are able to categorize the data attributes in them by the data rights and domain and share the information among themselves to enforce the data sharing among applications across multiple SDMs.

In one aspect, policy details may be appended to share data packets for global enforcement among the multiple platforms. For example, consider applications reading data across multiple SDMs in multiple SaaS platforms, i.e., a network of SDMs. Assume Application A in SDM A and SaaS platform A reads Data B in SDM B and SaaS platform B. Data B is packaged as a "data packet" in SaaS B and passed (send) to SaaS A over a network protocol like TCP/IP. To ensure the data policy related to Data B is still enforced in SDM A by Application A, SDM B may append any policy details it discovered in the data packet of Data B before passing it to SDM A.

For instance, the shared data packet may be propagated to applicable applications within a single Software-as-a-Service platform and/or to applicable external Software-as-a-Service platforms. Each data attribute in SDM may be associated with one or more policies about its access, and the data plus its access policy comprises its "data packet". Whenever an application tries to access the data, SDM opens the data packet to check if the application has the right to access the data. In case the data is accessed by an application in another platform which is connected through a network, the data packet is "transmitted" to the destination platform and opened by SDM in the destination platform for checking the access right.

Figure 2:
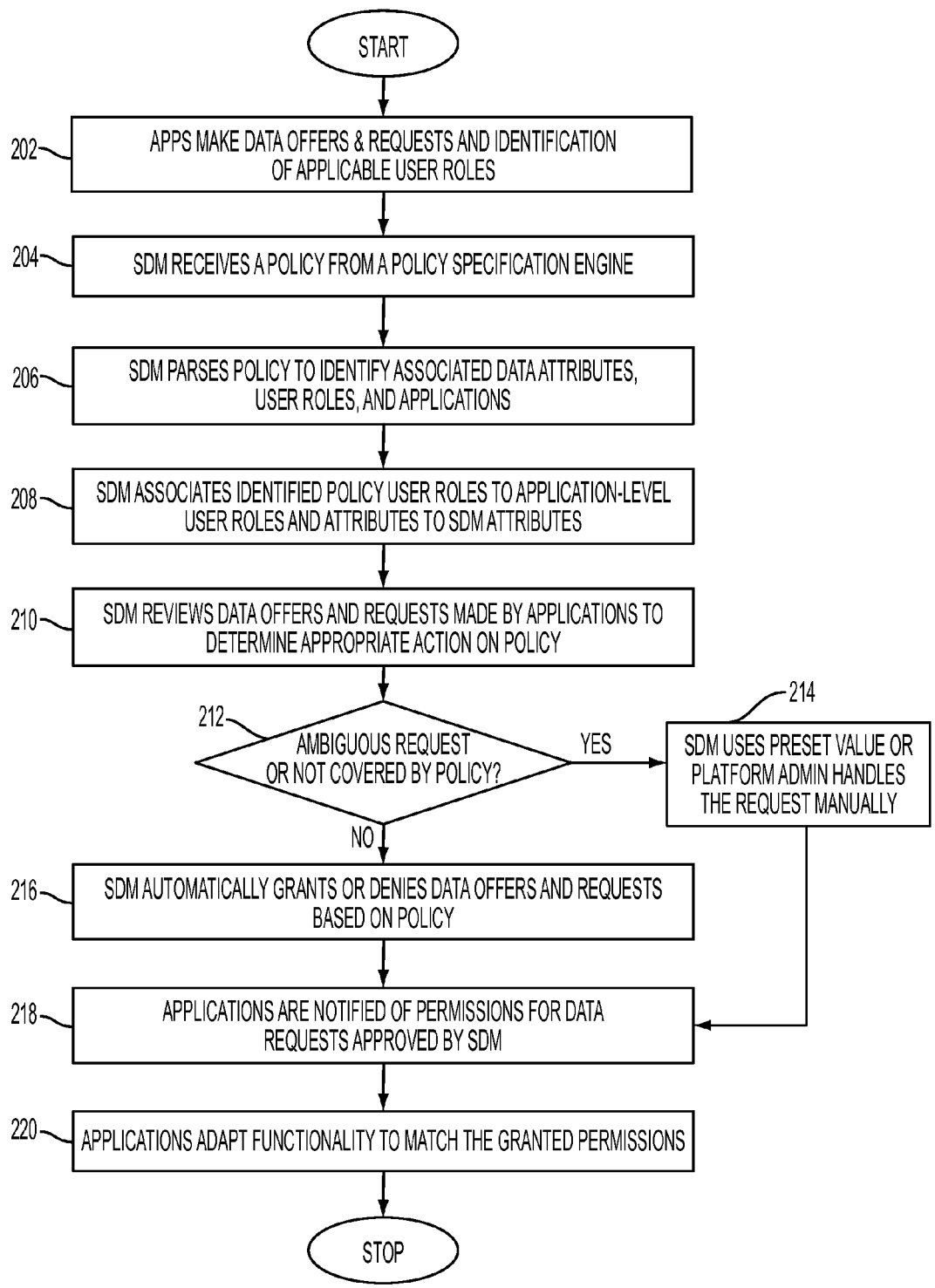
FIG. 2 is a flow diagram illustrating SDM enforcing data sharing policies in one embodiment of the present disclosure.

FIG. 2 is a flow diagram illustrating SDM enforcing data sharing policies in one embodiment of the present disclosure. At 202, applications send data offers to update data and/or requests to read data. The applications also send identification of applicable user roles, for example, the role of the user that is requesting the data. The access right of an application to specific data may be determined by the roles of the users who run the application. To ensure the correct access right check, each application may provide the information of its user roles, e.g., tax assessor, tax collector, clerk, zoning manager, and/or others, for instance, in the municipal government domain.

At 204, SDM receives a policy from a policy specification engine. The policy specification engine may be a module that stores a plurality of rules governing the data managed by SDM. The policy specification engine may be an external module to the SaaS platform, or it can also be implemented in the platform. For example, a set of rules are uploaded to SDM when it is initiated. The rules and policies may keep changing as the applications, users, laws, regulations are continuously changing in the real world. The rule/policy set in SDM also is continuously refreshed. In addition, in one embodiment of the present disclosure, whenever there is a change, the consistency and integrity of the resulted rules are checked and ensured. The dynamic updating of the policies, consistency and integrity checking may be performed manually or automatically by a processor or machine. For instance, commercial products like IBM™ ILOG™ JRule™ provides the functionality of consistency and integrity checking.

At 206, SDM may parse the policy and identify associated data attributes, user roles and applications. For instance, data attributes which is the policy refers to, may be identified. The policy may also indicate specific roles of the users who can access the data. The policy further may specify which applications may access the data objects and attributes.

At 208, SDM associates the user roles identified in the policy to application-level user roles. Similarly, data attributes identified in the policy are associated with the SDM data attributes.

At 210, SDM reviews data offers and requests made by applications to determine appropriate action on policy. For example, a policy may describe which application based on the roles of the users can read and/or write which data attributes in SDM, so the association among data application, user roles, access types (read and/or write) and data attributes are identified. When SDM determines permission or denial of data offers or request of applications, it decides on the appropriate action (permission or denial) for the data offer or request. Thus, the decision to grant or deny shared data access is automated in SDM.

At 212, if the data offer or requests are ambiguous or not covered by the policy, SDM may use a preset value to grant or deny the request, or an administrator may manually grant or deny the request at 214. Otherwise, at 216, SDM automatically grants or denies data offers and requests based on the policy.

At 218, the requesting application(s) are notified of permissions for data requests approved by SDM. At 220, the applications may adapt their functionality to match the granted permissions. For example, features or functions of an application may be activated or deactivated dynamically based on the permissions. Co-owned patent application, U.S. patent application Ser. No. 13/163,177 entitled DYNAMIC APPLICATION ADAPTATION IN SOFTWARE-AS-A-SERVICE PLATFORM describes adapting of functionalities based on permission grants and denials. That application is incorporated herein by reference in its entirety.

Figure 3:
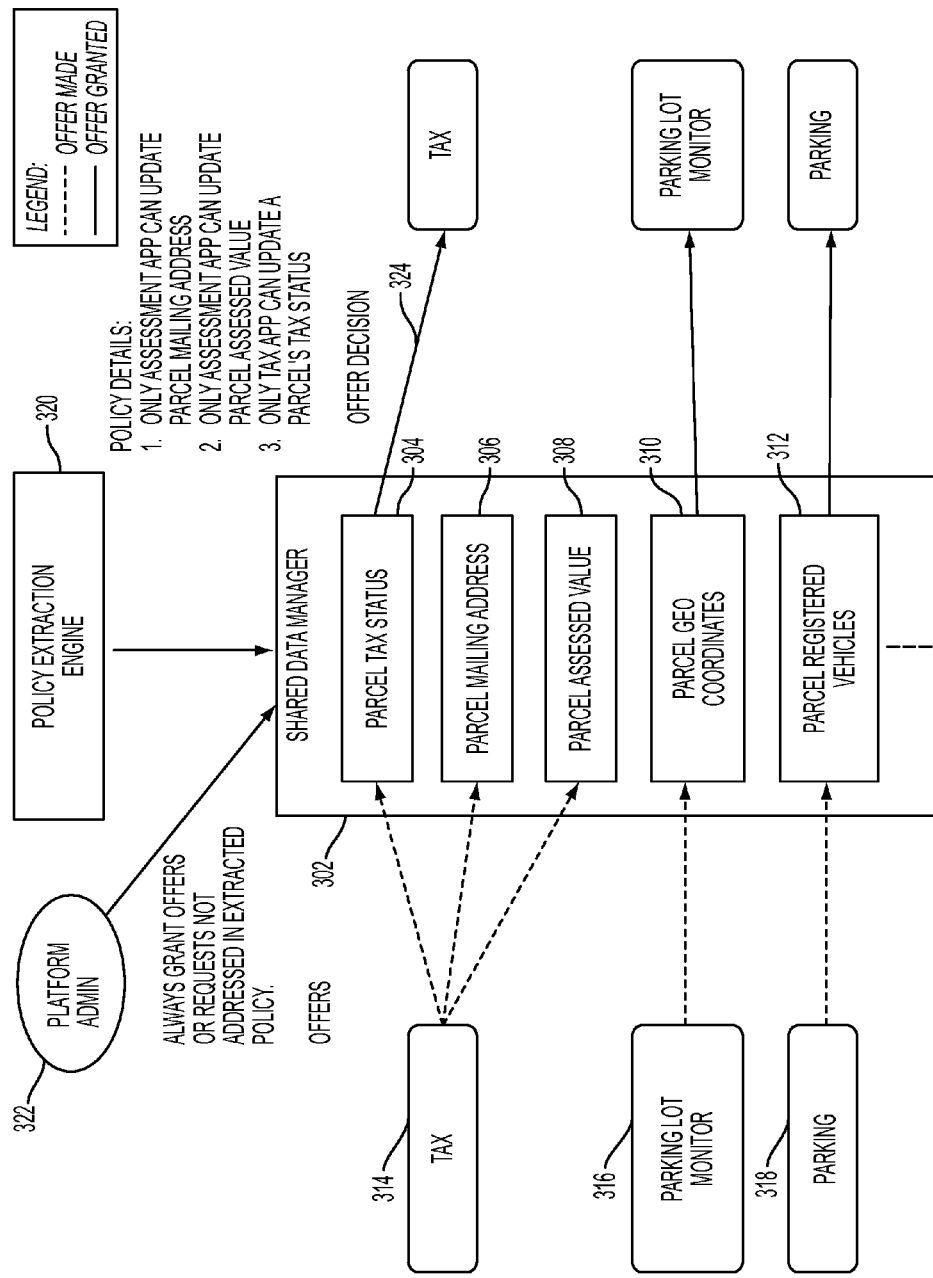
FIG. 3 is a component diagram illustrating an example detailed system view for offers in one embodiment of the present disclosure.

FIG. 3 is a component diagram illustrating an example detailed system view for offers in one embodiment of the present disclosure. Data attributes of parcel tax status 304, parcel mailing address 306, parcel assessed value 308, parcel geo coordinates 310, and parcel registered vehicles 312 are some of the examples of data SDM 302 manages. SDM 302 may receive offers from one or more of applications 314, 316 and 318 for SDM's data. For instance, a tax related application 314 may request data offers for a parcel tax status data attribute 304, a parcel mailing address data attribute 306 and a parcel assessed value data attribute 308. A parking lot monitor application 316 may request data offers for a parcel geo coordinates data attribute 310. A parking application 318 may request data offers for a parcel registered vehicles data attribute 312. A policy extraction engine 320 of the SDM 302 may identify one or more policy rules associated those requested data. For example, there may be policies that indicate that "only assessment application can update parcel mailing address", "only assessment application can update parcel assessed value" and "only tax application can update a parcel's tax status." SDM 320 may parse those policies rules and determine whether the requested offers from the tax applications 314 can be granted. Since according to those policy rules, a tax application cannot update parcel assessed value or parcel mailing address attributes, those requests are denied. On the other hand, a policy rule specifies that a tax application can update the parcel status attribute, that request is granted as shown at 324. Similarly, SDM 320 may process the requests from parking lot monitor 316 and parking 318 applications based on one or more policy rules associated with those applications and/or requested data attributes. In one aspect, if there are no policy rules that address the received data offers or read requests, a platform administrator 322 may manually grant or deny those requests.

Figure 4:
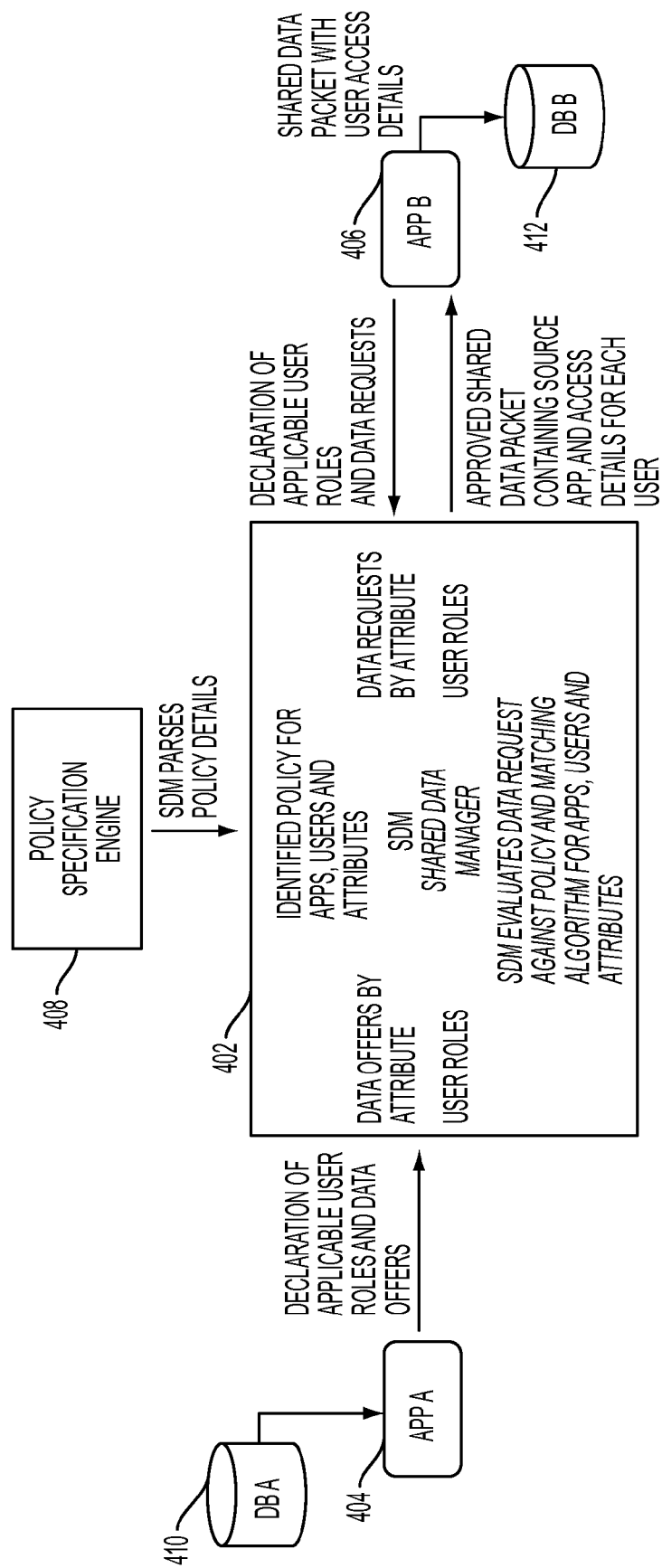
FIG. 4 is a diagram illustrating global data sharing policy implementation in one embodiment of the present disclosure.

FIG. 4 is a diagram illustrating global data sharing policy implementation in one embodiment of the present disclosure. SDM 402 in one embodiment employs global mechanism for access rights to shared data. As data moves from SDM 402 to multiple applications (e.g., 404, 406), the rights to access are defined in a single location (e.g., 408) and propagated across all databases (e.g., 410, 412). In another aspect, SDM's data policy tagging capability may be used to direct access rights for specific data shared with external databases.

Shared data contained within a packet may include data source and specifications on access rights for associated user roles. When a data packet is transmitted from an SDM to another SDM over a network to serve a distributed data request from an application, the data packet includes various elements—the data itself, the source application and the source SDM (source application in the source SDM), the destination application and the destination SDM (destination application in destination SDM), one or more applications which can access this data based on the user roles associated with the application, and other information—all this information is useful for tracking and auditability.

As an example, Application A 404 has its local database A 410. Similarly, Application B 406 has its local database B 412. Application A 404 may declare or send data offers to SDM 402 with applicable user roles, e.g., the data attributes to be updated and the role of the users who will update the data attributes. SDM 402 may receive one or more policy rules from a policy specification engine 408 and identify one or more policies associated with application A, specified user roles and/or data attributes. SDM 402 parses those policies to determine whether to grant or deny the data offers. Application B 406 may declare or send data requests (to read the data) and applicable user roles (who will read the data) to SDM 402. SDM 402 evaluates the data request against one or more policies and match applications, users and attributes. For example, SDM 402 evaluates and approves the data requests by Application B 406. In response, the data is read by Application B 406. For example, the data packet of the shared data is transmitted to Application B 406. The shared data packet contains the application which offered and wrote the data value in SDM 402, and applications which can access this data based on the user roles associated with the application, among others. In response to receiving the data packet, Application B 406 may store the information from the shared data packet in its local database 412.

Figure 5:
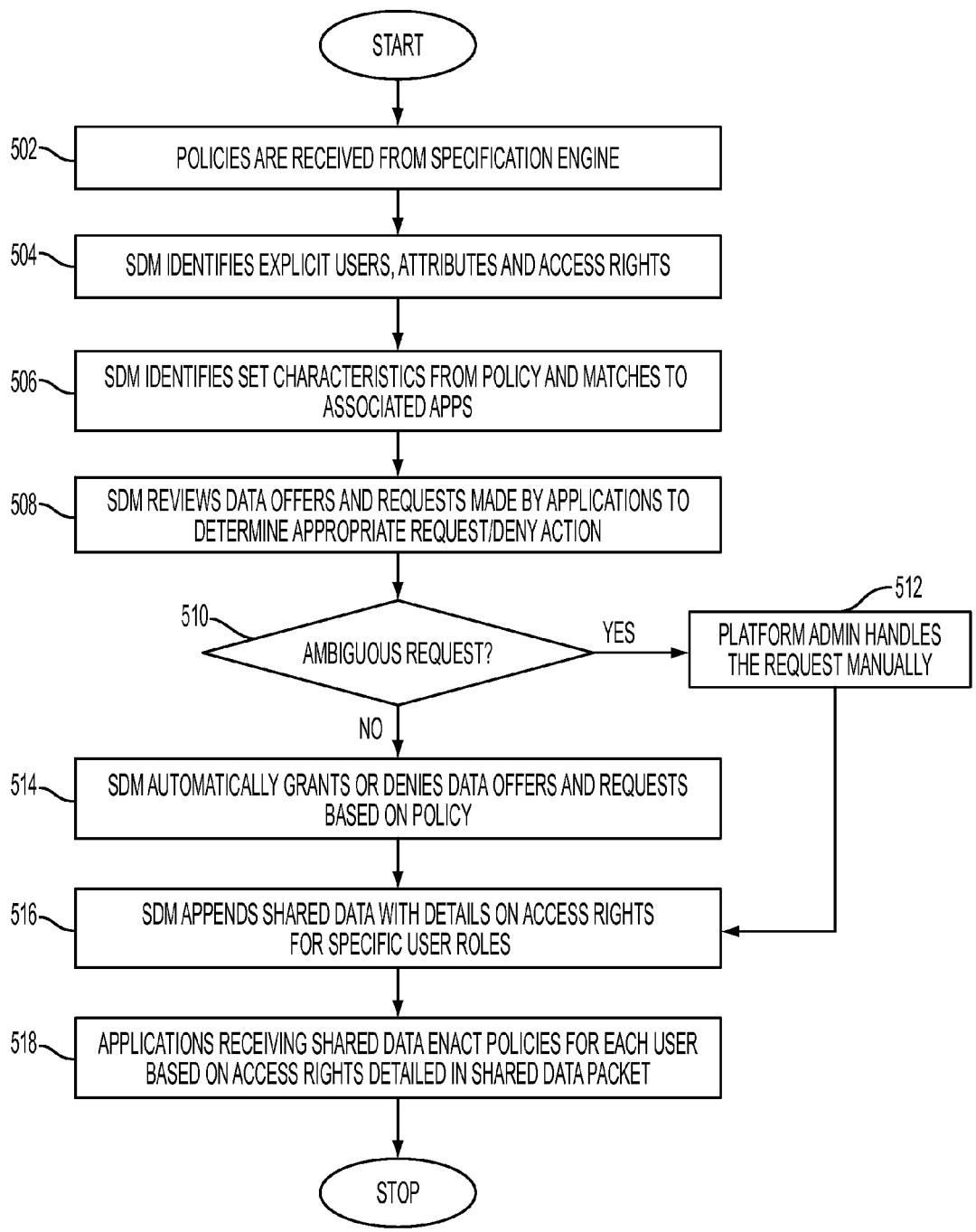
FIG. 5 is a flow diagram illustrating parsing and global enforcement of policies in one embodiment of the present disclosure.

FIG. 5 is a flow diagram illustrating parsing and global enforcement of policies in one embodiment of the present disclosure. In one embodiment, each application is identified by one or more related types from a purpose set {building, tax, assessment, finance, and other} and/or an object set {parcel, citizen, employee, internal_asset, and others}. Policy statements define access rights for users to specified attributes. SDM identifies exact term matches for policy attributes to attributes from a master data model. Policy based roles are matched exactly to application-based roles. Additionally, the administrator can pre-define role synonymous associations. e.g., finance_employee is the same as {accounting_employee, accounts_payable_employee}. An explicit username in a policy may be matched to an associated role. Policy statements containing specific set characteristics are enacted for applications with set associations. If set characteristics are not identified in a policy, policies are enacted on a basis of identified user roles, attributes, and access rights. Ambiguous policy statements are routed to an administrator for review, association, and/or enactment.

At 502, one or more policies are received from a specification engine. At 504, SDM identifies explicit users, attributes and access rights specified in the received policies. At 506, SDM identifies set characteristics from policy and matches to associated applications. At 508, SDM reviews data offers and requests made by applications to determine appropriate request or deny actions. At 510, if a request is determined to be ambiguous, a platform administrator may manually handle the request at 512. Otherwise, at 514, SDM automatically grants or denies data offers and request based on one or more policy rules. At 516, SDM appends shared data with details on access rights for specific user roles. At 518, applications receiving shared data enact policies for each user based on access rights detailed in the shared data packet.

Examples of policy requirement may include restrictions on data access for specific applications, restrictions on data access for specific users, temporal restrictions, details to identify authoritative sources of information, incorporation of new or updates to existing policies, regulation of data request, trades or purchase by external entities, or others.

For example, policy restrictions based on an application may include policy details created by the policy specification engine that specify the applications within a subscription set that are allowed to update specific attributes (e.g., parcel address) or attribute types (e.g., all attributes in parcel object). A subscription set refers to a set of applications subscribed by a customer (e.g., organization such as a municipality or an end-user) of one or more SDMs (and SaaS platforms). As another example, policy details may specify the applications within the subscription set that are allowed to read specific SDM attributes, attribute types, or attributes derived from a particular location (e.g., attributes published by a tax application).

Examples of policy restrictions based on one or more user roles may include policy details created by the policy specification engine that specify the specific data from SDM that can be shown to authorized users by applications within the subscription set. When an application joins the subscription set, the application may identify its set of user roles to the platform. The extracted policy can specify which users can or cannot view SDM-based attributes in the applications. Data attributes may be specified according to specific attributes (e.g., parcel address), attribute types (e.g., all attributes in parcel object), or attributes derived from a particular location (e.g., attributes published by a tax application). The users can be specified by role (e.g., administrator, manager, employee) or department (e.g., assessment employees, human resource (HR) employees).

Example of policy restrictions based on temporal considerations may include policy details that specify that certain data attributes can only be published to the SDM or viewed by some applications or users during specified time periods. For instance, "a finance application can only read attributes published to the SDM by the HR application during from the 1st to the 5th of every month (the monthly financial reconciliation period)", may be an example of such a rule.

Examples of authoritative sources of information based on policy may include: If two applications offer to update the same attribute, the policy details may specify that a specific application is the authoritative source. The offer of the application identified as an authoritative source in the policy is granted while the other application's offer is denied. A policy can specify the authoritative source of specific attributes (e.g., parcel address) or attribute types (e.g., all attributes in parcel object).

Examples of incorporating new or updating existing policies may include: When a new policy is instated or an existing policy is updated it may have an impact on prior data offers or requests to SDM. The results of these prior data offers or requests may be altered by SDM to reflect the policy. For example, if a tax application's offer to publish the parcel mailing address attribute to SDM was previously granted, and a policy is enacted that states that only an assessment application may update the parcel mailing address attribute, the tax application's offer request is automatically revoked and future offers from the tax application is declined.

Examples of policy regulation of data request, trades or purchase by external entities may include an extracted policy that may detail if and/or how SDM data can be requested by, traded to or purchased by external entities. For example, only governmental organizations may have access to parcel assessment data, municipalities may offer to share or trade parcel data with one another, businesses and non public-sector organizations may not request or purchase personnel data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of managing shared data for one or more applications hosted on one or more Software-as-a-Service platforms, comprising:
   receiving one or more data policy specifications from a policy specification engine;
   extracting data access rights from the one or more data policies based on a user role, data purpose, an object set and a constraint identification;
   extracting a data domain from the one or more data policies based on the data purpose and the object set;
   associating the data access rights and the data domain with data attributes of the shared data;
   automatically responding to application-based offers and requests for the shared data within a Software-as-a-Service platform based on the data access rights;
   identifying based on the data domain, one or more applications as an authoritative source for attribute-level data sharing within a Software-as-a-Service platform;
   enforcing data sharing constraints between multiple Software-as-a-Service platforms based on the data rights and the data domain;
   appending policy details, the policy details including the data domain and the data access rights associated with the data attributes of the shared data, to a shared data packet;
   propagating the shared data packet to one or more applicable applications within a single Software-as-a-Service platform; and
   propagating the shared data packet to one or more applicable external Software-as-a-Service platforms.

2. The method of claim 1, further including globally enforcing data sharing policies based on the propagated shared data packet including the policy details.

3. The method of claim 1, wherein the data domain includes data access rights categorized by a domain.

4. The method of claim 3, wherein domain categories include application and user role.

5. The method of claim 1, wherein the data attributes include individual attributes within one or more data objects.

6. The method of claim 1, wherein the object set includes one or more data objects.

7. The method of claim 1, wherein said one or more policy specifications change dynamically.

8. The method of claim 7, wherein said one or more policy specifications include temporal constraint on data.

9. A system for managing shared data for one or more applications hosted on one or more Software-as-a-Service platforms, comprising:
   a processor;
   a shared data management module operable to execute on the processor, and further operable to receive one or more data policy specifications from a policy specification engine, the shared data management module further operable to extract data access rights from the one or more data policies based on a user role, data purpose, an object set and a constraint identification, the shared data management module further operable to extract a data domain from the one or more data policies based on the data purpose and the object set, the shared data management module further operable to associate the data access rights and the data domain with data attributes of the shared data, the shared data management module further operable to automatically respond to application-based offers and requests for the shared data within a Software-as-a-Service platform based on the data access rights, the shared data management module further operable to identify based on the data domain, one or more applications as an authoritative source for attribute-level data sharing within a Software-as-a-Service platform, the shared data management module further operable to enforce data sharing constraints between multiple Software-as-a-Service platforms based on the data rights and the data domain, the shared data management module further operable to append policy details, the policy details including the data domain and the data access rights associated with the data attributes of the shared data, to a shared data packet, the shared data management module further operable to propagate the shared data packet to one or more applicable applications within a single Software-as-a-Service platform, and propagate the shared data packet to one or more applicable external Software-as-a-Service platforms.

10. The system of claim 9, wherein data sharing policies are globally enforced based on the propagated shared data packet including the policy details.

11. The system of claim 9, wherein the data domain includes data access rights categorized by a domain.

12. The system of claim 11, wherein domain categories include application and user role.

13. The system of claim 9, wherein the data attributes include individual attributes within one or more data objects.

14. The system of claim 9, wherein the object set includes one or more data objects.

15. The system of claim 9, wherein said one or more policy specifications change dynamically.

16. The system of claim 15, wherein said one or more policy specifications include temporal constraint on data.

17. A computer readable storage medium, excluding a signal per se storing a program of instructions executable by a machine to perform a method of managing shared data for one or more applications hosted on one or more Software-as-a-Service platforms, comprising:
   receiving one or more data policy specifications from a policy specification engine;
   extracting data access rights from the one or more data policies based on a user role, data purpose, an object set and a constraint identification;
   extracting a data domain from the one or more data policies based on the data purpose and the object set;
   associating the data access rights and the data domain with data attributes of the shared data;
   automatically responding to application-based offers and requests for the shared data within a Software-as-a-Service platform based on the data access rights;
   identifying based on the data domain, one or more applications as an authoritative source for attribute-level data sharing within a Software-as-a-Service platform;
   enforcing data sharing constraints between multiple Software-as-a-Service platforms based on the data rights and the data domain;
   appending policy details, the policy details including the data domain and the data access rights associated with the data attributes of the shared data, to a shared data packet;
   propagating the shared data packet to one or more applicable applications within a single Software-as-a-Service platform; and
   propagating the shared data packet to one or more applicable external Software-as-a-Service platforms.

18. The computer readable storage medium of claim 17, further including globally enforcing data sharing policies based on the propagated shared data packet including the policy details.

19. The computer readable storage medium of claim 17, wherein the data domain includes data access rights categorized by a domain.

20. The computer readable storage medium of claim 19, wherein domain categories include application and user role.

21. The computer readable storage medium of claim 17, wherein the data attributes include individual attributes within one or more data objects.

22. The computer readable storage medium of claim 17, wherein the object set includes one or more data objects.

23. The computer readable storage medium of claim 17, wherein said one or more policy specifications change dynamically.

24. The computer readable storage medium of claim 17, wherein said one or more policy specifications include temporal constraint on data.

* * * * *